2,914,520

POLYMERIZATION OF ETHYLENE WITH A CATALYST OF ALKYL ALUMINUM AND A GROUP III-A METAL SALT

Edwin J. Vandenberg, Wilmington, Del., assignor to Hercules Powder Company, Wilmington, Del., a corporation of Delaware No Drawing. Application March 19, 1957
Serial No. 646,961

9 Claims. (Cl. 260—94.9)

This invention relates to the polymerization of ethylene under relatively mild conditions of pressure and temperature and, more particularly, to a new catalyst for the polymerization of ethylene under such conditions.

K. Ziegler has described the polymerization of ethylene with organometallic compounds of the metals of group III-A of the periodic table, i.e., organometallic compounds of aluminum, gallium and indium to produce polymers varying in molecular weight from dimers up to the wax range polymers. He has also described the preparation of high molecular weight crystalline polymers by contacting ethylene with a mixture of an organoaluminum compound and a compound of a metal of groups IV-B, V-B, VI-B or VIII of the periodic table.

Very surprisingly and contrary to the teaching of Ziegler and others that to obtain a high molecular weight crystalline polyethylene, a combination of an organometallic compound of groups I, II or III must be used with a transition metal compound, i.e., a compound of one of the groups IV-B, V-B, VI-B or VIII metals, it has now been discovered that ethylene may be polymerized to a high molecular weight crystalline polymer under relatively mild conditions of pressure and temperature by contacting it with a catalyst formed by mixing an organometallic compound of a metal selected from the group consisting of the alkali metals, alkaline earth metals and aluminum with a salt of a higher metal of group III-A of the periodic table, i.e., having an atomic number greater than 13. It was most unexpected to discover that ethylene could be polymerized by combining one of these organometallic compounds with a salt of one of the heavier group III-A metals and obtain high molecular weight crystalline polyethylenes.

The polymerization of ethylene in accordance with this invention may be carried out in a wide variety of ways. It may be carried out as a batch or continuous operation and generally is carried out in the presence of an inert organic diluent as the reaction medium. Any inert liquid organic solvent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated aliphatic hydrocarbons such as methylene chloride, chloroform, carbon tetrachloride, ethylene dichloride, etc., halogenated aromatic hydrocarbons such as chlorobenzenes, chloronaphthalenes, etc.

The polymerization of ethylene in accordance with this invention may be carried out by forming the catalyst in situ, i.e., adding first one catalyst component followed by the other, or adding the two catalyst components simultaneously to the ethylene, or a preformed catalyst may be used by mixing the group III-A metal salt with the organometallic compound, usually in an inert organic diluent, and then adding the ethylene to the preformed catalyst. Obviously, many other variations in the process may be made, for example, either one or both components of the catalyst may be added in increments during the polymerization.

Any salt of the group III-A metal, i.e., of gallium, indium or thallium, may be used as one of the components of the catalyst in accordance with this invention. The salt may be an inorganic or organic salt or a complex, etc. Exemplary of the gallium, indium or thallium salts that may be used are gallium acetate, gallium dibromide, gallium tribromide, gallium dichloride, gallium trichloride, gallium trifluoride, gallium oxychloride, indium monobromide, indium dibromide, indium tribromide, indium monochloride, indium dichloride, indium trchloride, indium trifluoride, thallium acetate, thallium monobromide, thallium dibromide, thallium tribromide, thallium carbonate, thallium monochloride, thallium trichloride, thallium sesquichloride, thallium monofluoride, thallium trifluoride and thallium sulfate. Of particular value are the halides of these metals. It is usually desirable to use these metal salts in the form of a solution or suspension in a diluent, as for example, of the type used in the polymerization of the ethylene or to use them in a finely divided form such as is obtained by grinding by any desired means, as for example, in a pebble mill, ball mill, etc.

The organometallic compound that is reacted with the group III-A metal salt may be any organo compound of an alkali metal, alkaline earth metal or aluminum. Of particular value are the organoaluminum compounds such as the alkylaluminum compounds, hydrides or complexes thereof. Exemplary of the organometallic compounds that may be used are the alkali metal alkyls or aryls such as butyllithium, amylsodium, phenylsodium, etc., dimethylmagnesium, diethylmagnesium, diphenylmagnesium, butylmagnesium chloride, phenylmagnesium bromide, trimethylaluminum, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organoaluminum compounds, as for example, sodium aluminum tetraethyl, lithium aluminum tetraoctyl, etc., aluminum hydride, and complexes of aluminum hydride such as lithium aluminum hydride. As in the case of the group III-A metal salt, if the organometallic compound is not at least partially soluble in the diluent used for the polymerization process, it may be desirable to ball-mill or otherwise finely divide it prior to its use in the process.

When the group III-A metal salt and the organometallic compound are mixed in the preparation of the catalyst, a reaction takes place, the nature of which is not completely understood. Nevertheless, the catalyst so produced is extremely effective for the polymerization of ethylene. The molar ratio of the group III-A metal salt to the organometallic compound may be varied over a wide range and will depend on the type of organometallic compound that is mixed with the particular group III-A metal salt. In general, the molar ratio of the organometallic compound to the group III-A metal salt will be from about 0.1:1 to 100:1 and more usually will be from about 0.3:1 to 10:1.

The selection of the temperature and pressure used for the polymerization process will obviously depend upon the activity of the catalyst system being used, the degree of polymerization desired, etc. In general, the polymerization will be carried out at room temperature or slightly above, but any temperature within the range of from about −50° C. to about 150° C., preferably from about −20° C. to about 120° C. and more preferably from about 20° C. to about 100° C. may be used. In the same way, while atmospheric pressure or a pressure of only a few pounds may be used, the polymerization may be carried out over a wide range of pressures, but higher pressures do not appreciably alter the course of the polymerization and, hence, are not required.

As will be obvious from the following examples, many polyethylenes so obtained are set forth in the table. While the polyethylenes produced in Example 2 were difficultly soluble, they were shown by their X-ray diffraction pattern to be highly crystalline.

The periodic table referred to in the specification and claims is that set forth in the "Handbook of Chemistry and Physics," published by the Chemical Rubber Publishing Company, pages 392–393 of the 36th edition.

Table

| Example | Group III-A Metal Salt | mmole/l. | Aluminum Compound | mmole/l. | Reaction Time Hrs. | RSV |
|---|---|---|---|---|---|---|
| 1a | TlCl | 20 | Al($C_2H_5$)$Cl_2$ | 60 | 19 | >0.04. |
| 2a | $GaCl_3$ | 20 | Al($C_2H_5$)$_3$ | 40 | 17 | Too high to measure [1]. |
| b | $GaCl_3$ | 20 | Al($C_2H_5$)$_2$Cl | 60 | 17 | >11.[1] |
| c | $GaCl_3$ | 20 | Al($C_2H_5$)$Cl_2$ | 60 | 17 | >4.5.[1] |
| 3a | $TlCl_3$ | 16 | Al($C_2H_5$)$_2$Cl | 60 | 19 | |
| b | $TlCl_3$ | 24 | Al($C_2H_5$)$Cl_2$ | 60 | 19 | |

[1] At 0.02% concentration.

variations may be made in the process of this invention. For example, in many instances, it may be desirable to add a viscosity-reducing agent such as hydrogen, etc., to reduce the viscosity of the polymer that is obtained. In some cases, oxygen may function as an activator or other desirable function and may be added.

The following examples will demonstrate the process of polymerizing ethylene in accordance with this invention and some of the many modifications that can be made in this process. The molecular weight of the polymers produced in these examples is indicated by the reduced specific viscosity (RSV) given for each. By the term "reduced specific viscosity" is meant the $\eta$ Sp/C determined on an 0.1% solution of the polymer in decalin, containing 0.1 g. of the polymer per 100 ml. of solution (unless otherwise indicated), at 135° C. All parts and percentages are by weight unless otherwise indicated.

EXAMPLES 1–3

In each of these examples a polymerization vessel, freed from air, was charged with about 35 parts of n-heptane and 2 parts of gaseous ethylene. The initial pressure in each case was about 50 p.s.i.g. After equilibrating at 30° C., the aluminum compound dissolved in n-heptane was added followed by addition of the group III–A metal salt. The thallium monochloride used in Example 1 was ball-milled in n-heptane whereas in Example 3 the thallium trichloride was added as the pure liquid. In Example 2 the gallium trichloride was ball-milled in n-heptane and the supernatent solution was used. The group III–A metal salt and amount thereof (expressed as millimoles per liter), the aluminum compound and the amount thereof and the reaction time for each polymerization are set forth in the following table. After the indicated number of hours at 30° C., the polymerization was stopped by adding 4 parts of anhydrous ethanol. The insoluble polymer that had separated was then isolated by filtration, refluxed with a 10% solution of hydrogen chloride in methanol, then washed with methanol until neutral, and dried. The RSV's of the

What I claim and desire to protect by Letters Patent is:

1. The process for the polymerization of ethylene which comprises contacting ethylene with a catalyst formed by mixing an alkylaluminum compound with a salt of a metal of group III–A of the periodic table having an atomic number greater than 13, and recovering a polymer of ethylene.

2. The process of claim 1 wherein the catalyst is formed by mixing an alkylaluminum compound with a gallium salt.

3. The process of claim 1 wherein the catalyst is formed by mixing an alkylaluminum compounds with a thallium salt.

4. The process of claim 2 wherein the gallium salt is gallium trichloride.

5. The process of claim 3 wherein the thallium salt is a thallium chloride.

6. The process of claim 4 wherein the alkylaluminum compound is a triethylaluminum.

7. The process of claim 4 wherein the alkylaluminum compound is diethylaluminum chloride.

8. The process of claim 4 wherein the alkylaluminum compound is ethylaluminum dichloride.

9. The process for the polymerization of ethylene which comprises contacting ethylene with a catalyst formed by mixing an alkylaluminum compound with a metal salt selected from the group consisting of thallium monochloride, thallium trichloride, and gallium trichloride.

References Cited in the file of this patent

UNITED STATES PATENTS

| 2,092,295 | Van Peski et al. | Sept. 7, 1937 |
| 2,699,457 | Ziegler | Jan. 11, 1955 |
| 2,868,771 | Ray et al. | Jan. 13, 1959 |
| 2,868,772 | Ray et al. | Jan. 13, 1959 |

FOREIGN PATENTS

| 540,459 | Belgium | Aug. 31, 1955 |